United States Patent
Augustin et al.

(10) Patent No.: US 12,353,201 B2
(45) Date of Patent: Jul. 8, 2025

(54) METHOD AND ARRANGEMENT FOR DETERMINING NEIGHBORHOOD RELATIONSHIPS BETWEEN AN ACTUATOR AND SENSORS IN AN INSTALLATION

(71) Applicant: Siemens Aktiengesellschaft, Munich (DE)

(72) Inventors: Martin Augustin, Karlsruhe (DE); Stefan Lüder, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 394 days.

(21) Appl. No.: 17/915,813

(22) PCT Filed: Mar. 31, 2021

(86) PCT No.: PCT/EP2021/058541
§ 371 (c)(1),
(2) Date: Sep. 29, 2022

(87) PCT Pub. No.: WO2021/198392
PCT Pub. Date: Oct. 7, 2021

(65) Prior Publication Data
US 2023/0168669 A1    Jun. 1, 2023

(30) Foreign Application Priority Data
Apr. 1, 2020  (EP) .................... 20167488

(51) Int. Cl.
*G05B 23/02* (2006.01)
*G01F 15/06* (2022.01)
(Continued)

(52) U.S. Cl.
CPC ......... *G05B 23/0256* (2013.01); *G01F 15/06* (2013.01); *G01F 25/10* (2022.01); *G05D 7/0635* (2013.01)

(58) Field of Classification Search
None
See application file for complete search history.

(56) References Cited

FOREIGN PATENT DOCUMENTS

| DE | 102010032712 | 12/2011 |
|----|--------------|---------|
| DE | 102011001614 | 10/2012 |

(Continued)

OTHER PUBLICATIONS

PCT International Search Report and Written Opinion of International Searching Authority mailed Jun. 16, 2021 corresponding to PCT International Application No. PCT/EP2021/058541 filed Mar. 31, 2021.

(Continued)

*Primary Examiner* — Daniel S Larkin
(74) *Attorney, Agent, or Firm* — Cozen O'Connor

(57) ABSTRACT

A method for determining neighborhood relationships between an actuator and sensors that interact with the an actuator in an installation for controlling a technical process and that communicate with the actuator, wherein the actuator influences the process and the sensors capture measured values of process variables, where the actuator influences the process in accordance with a predefined test pattern, searches for the predefined test pattern in sequences of measured values received from the sensors as responses to the test pattern, and identifies the sensor whose response best satisfies a predefined quality criterion in terms of response quality and response time as the sensor with the greatest operative proximity to the actuator.

15 Claims, 3 Drawing Sheets

(51) Int. Cl.
*G01F 25/10* (2022.01)
*G05D 7/06* (2006.01)

(56) References Cited

FOREIGN PATENT DOCUMENTS

| EP | 2506096 | 10/2012 |
|----|---------|---------|
| WO | 2018007190 | 1/2018 |

OTHER PUBLICATIONS

Rashid MD Mamunur et al. "A Survey on Behavioral Pattern Mining From Sensor Data in Internet of Things", IEEE Access, IEEE, vol. 8, pp. 33318-33341, 2020.

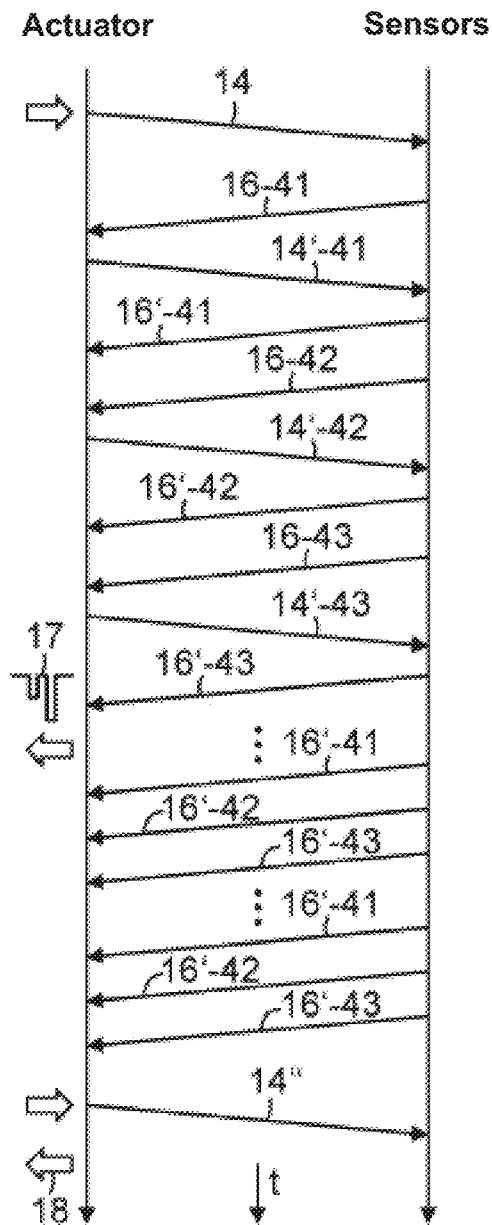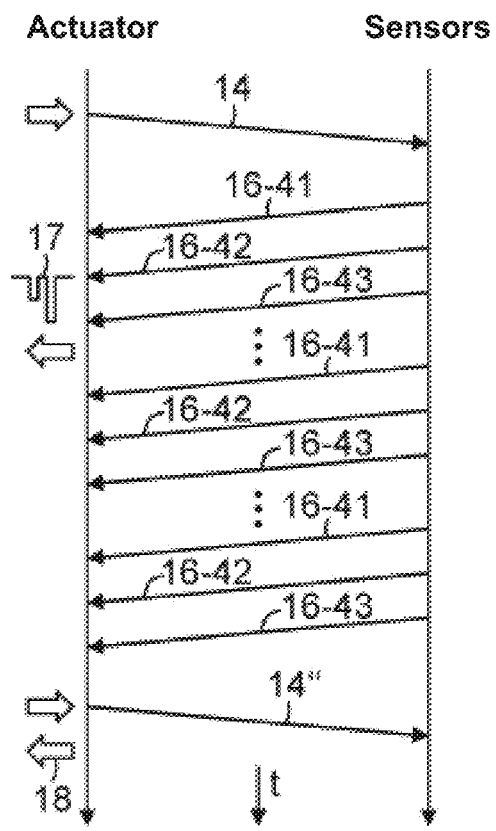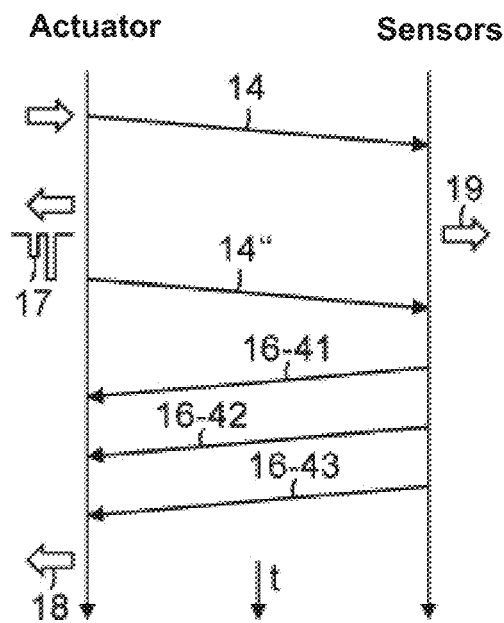

METHOD AND ARRANGEMENT FOR DETERMINING NEIGHBORHOOD RELATIONSHIPS BETWEEN AN ACTUATOR AND SENSORS IN AN INSTALLATION

CROSS-REFERENCE TO RELATED APPLICATIONS

This is a U.S. national stage of application No. PCT/EP2021/058541 filed 31 Mar. 2021. Priority is claimed on European Application No. 20167488.4 filed 1 Apr. 2020, the content of which is incorporated herein by reference in its entirety.

BACKGROUND OF THE INVENTION

1. Field of the Invention

The invention relates to an arrangement and a method for determining proximity relationships between an actuator and sensors that interact with the actuator in an installation for controlling a technical process and that communicate with the actuator, where the actuator influences the process and the sensors capture measured values of process variables.

2. Description of the Related Art

In process industry installations, e.g., in the industry producing chemical, petrochemical, pharmaceutical, foodstuffs and other products, in the field level locally distributed, decentralized field devices carry out predefined functions in the scope of installation automation and in the process exchange process-, installation- and/or device-relevant information with components of a higher-level control and management system and possibly also with one another. Field devices include sensors (measuring transducers for, e.g., fill level, flow rate, pressure and temperature, analysis devices for gas or liquid analysis, weighing systems) that transfer process data in the form of measured values of process variables, and actuators (actuating drives, position regulators for valves, other decentralized regulators and frequency converters for electromotive drives of, e.g., pumps), which receive process data in the form of positioning data in order to influence the process.

The field devices are typically equipped with a self-monitoring functionality, which monitors the functionality of the field device during the ongoing operation and thus ensures, e.g., the accuracy of the delivered measured values. Particularly with actuators, the checking of the functionality can also occur within the scope of a self-test outside of the ongoing operation or in a manner that only insignificantly interferes with the ongoing operation. The data received relating to the state or to the capability of the field device can be stored inside the device or, e.g., transmitted into a cloud and stored there.

The functionality of actuators can often only be determined together with other field devices, in particular sensors, which are installed in the installation in direct operative proximity to the actuator. For example, a position controller (positioner) with a control or regulating valve and a flow rate measuring transducer, which together regulate a flow rate, form a typical group. One further example is a pump with a frequency converter drive and a flow rate measuring transducer, which likewise together regulate a flow rate. In addition or instead of the flow rate measuring transducer, a pressure measuring transducer can be part of the group, if a pressure is to be regulated.

One problem consists in the linking of measured values of different field devices representing a manual engineering outlay. The linking of measured values can occur, e.g., in the management system, i.e., the process communication is planned and the values are made available to an algorithm for further processing by way of the process image of the controller. A local interconnection of measuring signals via input/output cards (I/O cards) in the devices must also be set up manually.

EP 2 506 096 A2 discloses a method for logically linking sensors and actuators within the scope of the commissioning of an installation system. An installation location attribute and a target location attribute is assigned to each actuator, e.g., a dimmer, where the installation location attribute specifies the location of the actuator in a building and the target location attribute specifies the location of the target of the actuator, e.g., the location of a light controlled by the dimmer. The actuators are influenced by sensors, where an installation location attribute is assigned to each sensor, for instance, a switch or brightness sensor, and specifies the location of the sensor in the building. Based on the target location attribute of an actuator, one or more sensors, via which the actuator is to be influenced, are selected from the group of sensors based on their installation location attribute and a logical interconnection is then established between the selected sensors and actuators.

M. M Rashid et al.: "A Survey on Behavioral Pattern Mining from Sensor Data in Internet of Things", IEEE Access, IEEE, USA, Vol. 8, Feb. 14, 2020, pages 33318-33341 provides an overview of the "Behavioral Pattern Mining" of sensor data in large wireless sensor/actuator networks. Page 33328 of this document specifies that a spatial correlation exists between the data of adjacent sensors and can be used to estimate missing sensor data. With association analysis, connections and dependencies can be identified in the data and expressed in the form of rules, where a correct operation of the actuators, which is relevant to the sensor values, can be retrieved via context-related association rules.

DE 10 2010 032712 B3 discloses a method for configuring a building automation system, in which a plurality of sensors and actuator are networked with one another. In order to configure the sensors, an actuator is selected by the user on a mobile terminal that transmits an item of information about the selected actuator to the building automation system. The sensor that belongs to the selected actuator is activated manually by the user and assigned logically to the selected actuator.

SUMMARY OF THE INVENTION

It is an object of the invention to provide an arrangement and method that automate the determination of proximity relationships between an actuator and sensors in an installation, in order thus to reduce the engineering outlay for checking the functionality of an actuator using measured values of adjacent sensors.

This and other objects and advantages are achieved in accordance with the invention by an arrangement and method for determining proximity relationships between an actuator and sensors which interact with the actuator in an installation for controlling a technical process and communicate with the actuator, where the actuator influences the process and the sensors capture measured values of process variables, where the actuator influences the process in accordance with a predefined test pattern, searches for the predefined test pattern in sequences of measured values received from the sensors as responses to the test pattern and identifies the sensor whose response best satisfies a predefined quality criterion in terms of response quality and response time as the sensor with the greatest operative proximity to the actuator.

It is also an object of the invention to provide an arrangement for determining proximity relationships between an actuator and sensors which interact with the actuator in an installation for controlling a technical process and communicate with the actuator, where the actuator influences the process and the sensors capture measured values of process variables, where the actuator is configured to influence the process according to a predefined test pattern, search for the predefined test pattern in sequences of measured values received from the sensors as responses to the test pattern and identify the sensor whose response best satisfies a predefined quality criterion in terms of response quality and response time as the sensor with the greatest operative proximity to the actuator.

In order to check its functionality in the installation, the actuator can then use the measured values of the identified sensor with the greatest operative proximity.

The predefined test pattern can be a sequence of individual influences of the process, which can have different time intervals to one another and/or have varying degrees of strength.

The sequences of measured values received from the sensors as responses to the test pattern are searched in accordance with the predefined test pattern and evaluated with respect to response quality and response time. The response quality contains in particular the reproduction accuracy of the test pattern in the sequences of measured values received as a response, i.e., the degree of correlation between the test pattern and the response. An additional quality criterion can also be the amplitude of the test pattern recognized again in the response, i.e., how significantly the process variable captured by the sensor responds to the influence of the process by the actuator. The response time corresponds to the time interval in which the test pattern appears in the response after the actuator has influenced the process.

The sensor whose response best satisfies a predefined quality criterion in terms of response quality and response time is determined based on the evaluations of the responses of the sensors to the influence of the process with the test pattern. At best, this is the sensor with which the process variable captured thereby responds most quickly, accurately, and significantly to the process influence with the test pattern. The response of a sensor with the short response time and inadequate response quality will not satisfy or more poorly satisfy the quality criterion than the response of another sensor with a longer response time but better response quality. The quality criterion is therefore a measure of the operative relationship between the actuator and the sensor in the technical installation.

The functionality of the actuator can now be determined together with the selected sensor. In other words, the measured values of the selected sensor are also used in addition to the data of the actuator for assessing the functionality or capability of the actuator.

The actuator can activate the sensors in order to transmit the measured values captured during the influence of the process according to the predefined test pattern. Alternatively, the sensors can be activated in order to store the measured values captured during the influence of the process according to the predefined test pattern and subsequent transmission of the stored measured value sequences to the actuator.

The functionality of the actuator can also be determined together with two or more sensors of a different type, e.g., flow rate transducer or pressure measuring transducer. Here, the actuator can select the sensors independently of one another from a group of the same sensor types in each case, where another quality criterion can be used in each case for each group of sensors.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below using exemplary embodiments and with reference to the figures of the drawing, in which, in detail:

FIGS. 3 to 5 show exemplary flow charts for the inventive method.

DETAILED DESCRIPTION OF THE EXEMPLARY EMBODIMENTS

Figure 1:
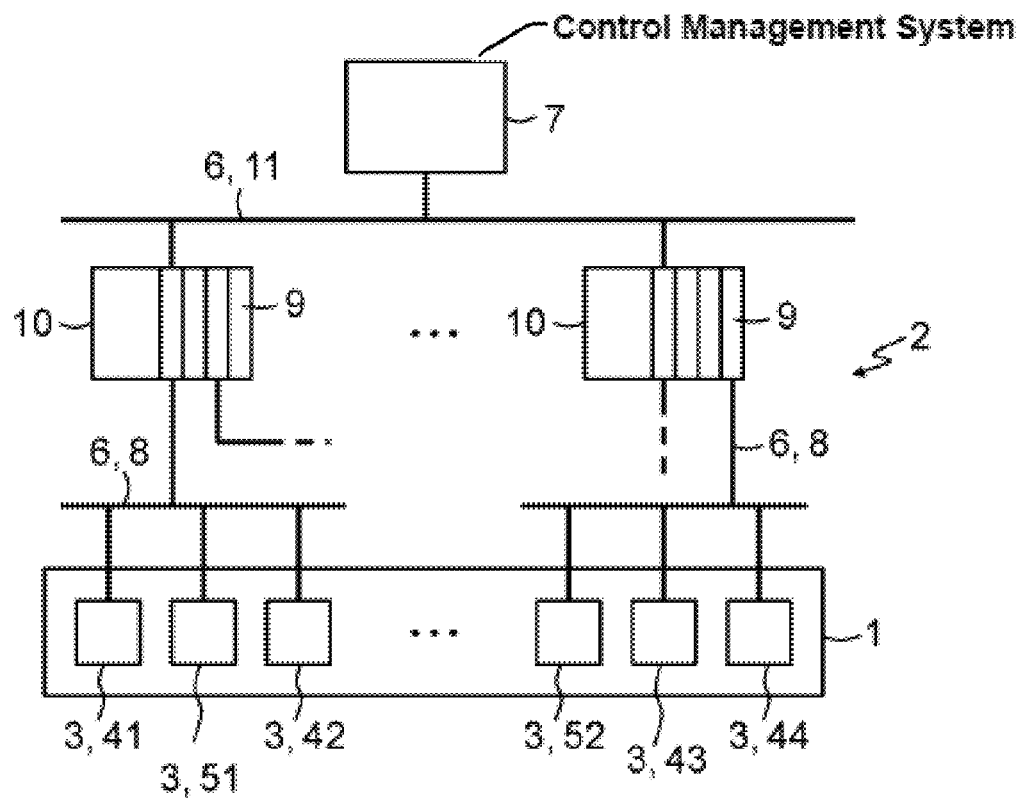
FIG. 1 shows an exemplary technical installation in which actuators and sensors interact in accordance with the invention.

The same reference characters have the same meaning in the different figures. The representations are purely schematic and do not represent any scale.

FIG. 1 shows a simplified, schematic representation of an exemplary technical installation 1, in which a process runs and is controlled via an automation system 2. The automation system 2 has a plurality of field devices 3, which, on the field level, i.e., in the process, perceive predefined measuring, control and regulation functions and in the process as sensors 41, 42, 43, 44 capture in particular measured values of process variables and as actuators 51, 52 act on the process via control actions. Typical sensors are measuring transducers for the fill level, flow rate, pressure and temperature, analysis devices for gas or liquid analysis and weighing systems. Typical actuators are actuating drives, position regulators for valves, other decentralized regulators and frequency converters for electromotive drives of, e.g., pumps.

The field devices 3 exchange process-, function- and/or device-relevant data with one another and with a higher-level control and management system 7 via a generally wired communication system 6, whereupon the field devices 3 are connected, e.g., via field buses 8 to input and output modules 9 of automation devices 10, e.g., programmable logic controllers (PLCs) that are in turn connected individually or via a central installation bus 11 with the higher-level control and management system 7.

The arrangement of the field devices 3 shown in FIG. 1 is geared to its connection with the field buses 8 of the communication system and does not reproduce its actual position within the installation.

Figure 2:
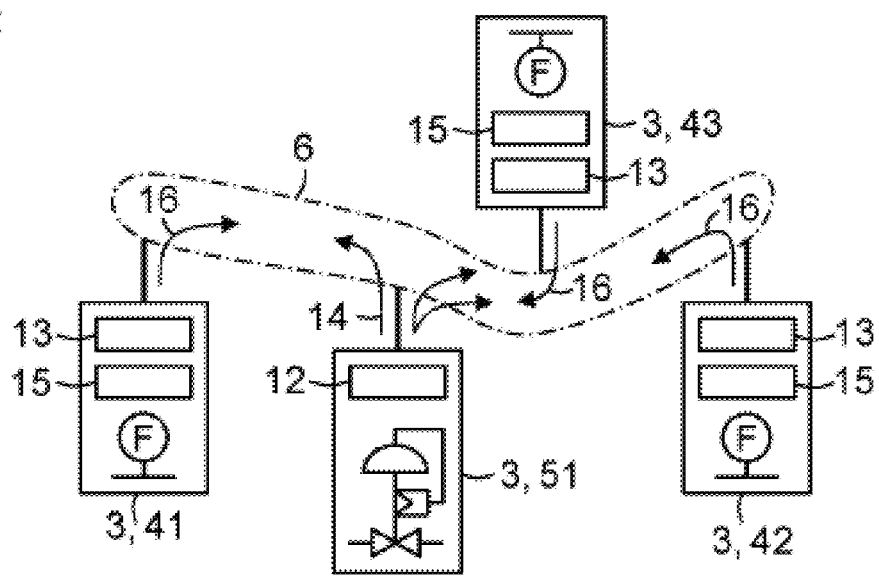
FIG. 2 shows an actuator and a plurality of sensors, the proximity of which to the actuator is to be determined in accordance with the invention.

FIG. 2 shows by way of example the actuator 51 in the form of a position regulator with control valve and the sensors 41, 42, 43 which, here, involve flow rate measuring transducers. The actuator 51 and the sensors 41, 42, 43 communicate via the communication system 6, the structure of which is not discussed here. Basically, the field devices 3 can also communicate with one another via alternative communication paths, e.g., wirelessly, because the sensors relevant to the invention are in practice arranged in the same installation part as the actuator or not at all far from this.

In order to determine the sensor with the greatest operative proximity, the actuator 51 includes an application (additional program) 12, via which during its commissioning, in accordance with a predefined test pattern, the actuator 51 acts on the process to determine the sensor that delivers the quickest and most accurate response to this test pattern with the measured values captured thereby. To this end, the sensors 41, 42, 43 include corresponding applications 13 in order to transmit hereto their measured values as a response to the process excitation by the actuator 51.

In the case of the position regulator, the test pattern can consist of a sequence of characteristic control movements (opening/closing) of the control valve. Here, the start of the sequence can occur via a user interface (device-specific keyboard or handheld operating tool such as smartphone, PDA or handheld organizer) or it starts automatically as part of the device run-up. Here, the sequence is preferably of such a short duration and/or such a low intensity that it is not influenced by the actual process. On the other hand, it is sufficiently long and of such an intensity that the test pattern can be captured by the sensors 41, 42, 43 in the closer process environment of the actuator 51. As a function of the process, there is the option to set the duration of the sequence and/or its repetition rate. In particular, with sufficiently slow processes, the duration of the sequence can be increased to increase the possibility of the detection of the test pattern in the measured values of the sensors 41, 42, 43. The process influence corresponding to the test pattern can also be implemented during operation or at specific intervals so that a proximity relationship between the actuator 51 and the sensors 41, 42, 43 can be verified continuously.

The application 12 in the actuator 51 provides this with communication access to the sensors 41, 42, 43. Initially the actuator 51 sends, e.g., as a multicast or broadcast, a detection request 14 into the communication system 6, which contains a call up, that sensors of a predefined sensor type, here, e.g., flow rate measuring transducer, are to register.

The call up may initially only contain the request for the communication address of the sensor, where the request then occurs separately after the sensor measured values. Alternatively, the call up can simultaneously contain the request to deliver measured values, or the sensors render this automatic. Finally, the call up can also contain the request that the sensors 41, 42, 43 are to store the measured values captured thereby during a predetermined duration or up to a time instant of a new call up of the actuator 51 in a data logger 15. The sensors 41, 42, 43 send the requested information and data 16 to the actuator 51.

At the same time or promptly with respect to the request of measured values from the sensors 41, 42, 43, the actuator 51 performs the process influence in accordance with the test pattern and reads in the measured values defined by the sensors 41, 42, 43. In accordance with a predefined time, the actuator 51 requests the sensors 41, 42, 43 to end the transmission of their measured values. Alternatively, the actuator may have communicated a time interval in advance to the sensors 41, 42, 43, within which they are to transmit the measured values hereto.

Based on the sequences of measured values received from the individual sensors 41, 42, 43, the application 12 in the actuator 51 determines that sensor which is most probably installed in the operative direction behind it in the installation 1, e.g., on a process pipe. This is performed by evaluating the received sequences of measured values with respect to response quality and response time. In other words, the sensor, the sequence of measured values of which delivered thereby best satisfies a predetermined quality criterion, is most probably the sensor in direct operative proximity of the actuator 51.

FIG. 3 shows a flow chart of a first example for determining the sensor with the greatest operative proximity to the actuator. As already mentioned, the actuator sends a detection request 14 to the sensors in the installation 1. This detection request 14 can be restricted to a specific sensor type, e.g., a flow rate meter, and possibly subsequently repeated for another sensor type, e.g., a pressure meter. The sensors, here 41, 42, 43 (FIG. 2), send in their responses 16-41, 16-42, 16-43 their communication addresses in the communication system 6 to the actuator 51 which, automatically or after operator input, sends requests 14'-41, 14'-42, 14'-43 to the sensors subsequently or at a suitable later point in time via the afore-cited user interface to transmit the measured values captured thereby. The sensors 41, 42, 43 then send within their responses 16'-41, 16'-42, 16'-43 the measured values captured thereby to the actuator 51, until the actuator invokes them via a multicast or broadcast command 14" to terminate the transmission of measured values. At the same or similar time to requesting the measured values from the sensors, the actuator 51 acts on the process in accordance with the test pattern 17. Finally, the sequences of measured values received by the individual sensors 41, 42, 43 and buffered in the actuator 51 are evaluated (18) in order to determine, as already described above, that sensor which is most probably installed in the operative direction behind the actuator 51 in the installation 1.

The exemplary embodiment, shown in FIG. 4, relating to the inventive method differs from that in FIG. 3 in that with the detection request 14 to the sensors the actuator 51 requests also to send the measured values in addition to the communication addresses in their responses 16-41, 16-42, 16-43.

In the exemplary embodiment shown in FIG. 5, the sensors 41, 42, 43 are requested by the call up 14 to buffer (19) the measured values captured thereby in their respective one data logger 15. The process influence was performed in accordance with the test pattern 17. Accordingly, the actuator 51 again sends a multicast or broadcast command 14" to the sensors 41, 42, 43, which thereupon transmit the recorded sequences of measured values to the actuator 51 for evaluation 18.

The checking of the functionality of the actuator 51 in the installation 1 is explained below in the example of a position regulator with a control or regulation valve (actuator 51) and a flow rate measuring transducer (e.g., 43), which was determined as a sensor with the greatest operative proximity to the actuator 51.

For the position regulator, over the course of its operating time, one would like to determine whether the regulation performance is further provided. For this purpose, the position regulator forms a histogram function with, e.g., 10 levels of 0, 10%, 20%, . . . 100% degree of opening. At the start of the operating time, the position regulator travels a ramp and can thus assign a specific flow rate quantity to each level. From now on the position regulator in the operating phase receives the flow rate measured value from the adjacent flow rate measuring transducer. If the position regulator now identifies a deviation from the previously calibrated assignment of flow rate measured value to the histogram level, this is an indication of a malfunction/wear in the position regulator. This performance characteristic value (KPI value) can be made available to an external application, for instance.

The proximity relationship of the actuator 51 to the sensors 41, 42, 43 can be determined once, e.g., upon commissioning of the actuator 51, and then, if necessary or continuously, e.g., at predetermined time intervals.

Figure 6:
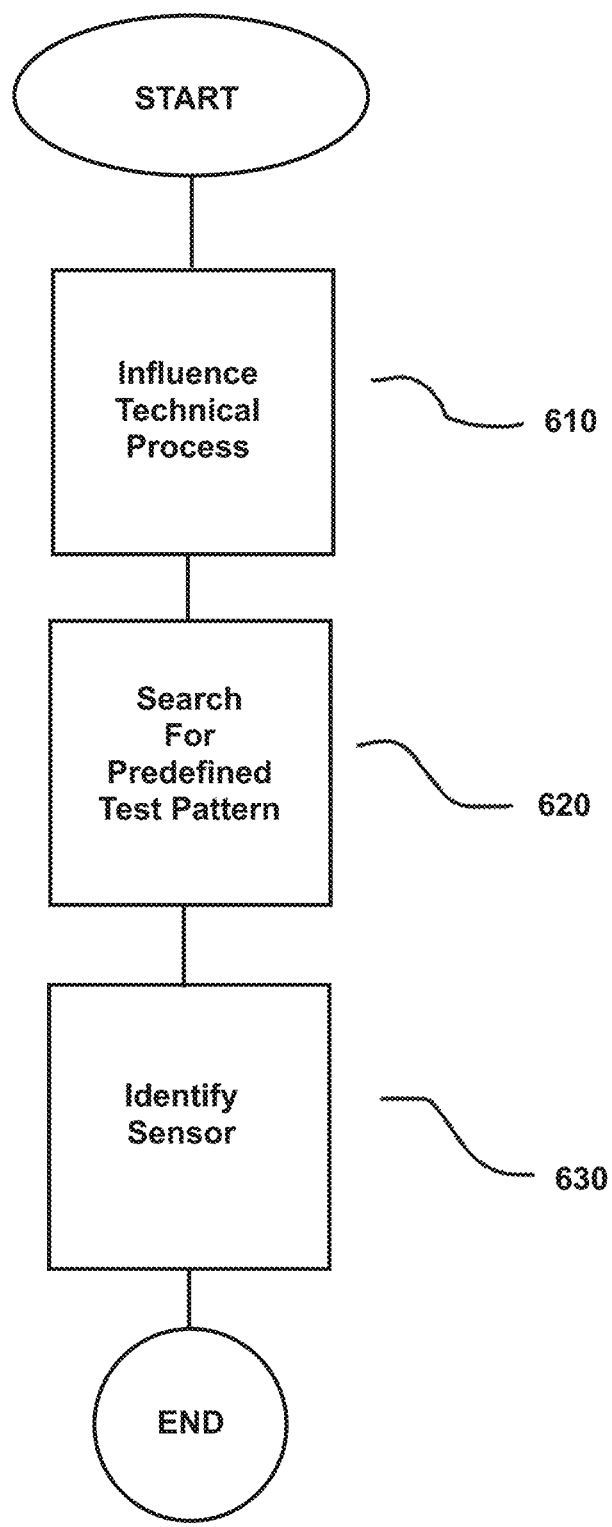

FIG. 6 is a further flowchart of the method for determining proximity relationships between an actuator 51 and sensors 41, 42, 43, 44 that interact with the actuator 51 in an installation 1 for controlling a technical process and that communicate with the actuator, where the actuator 51 influences the process and the sensors 41, 42, 43, 44 capture measured values of process variables.

The method comprises influencing, by the actuator 51, the technical process in accordance with a predefined test pattern 17, as indicated in step 610.

Next, the actuator 51 searches for the predefined test pattern in sequences of measured values received from the sensors 41, 42, 43, 44 as responses 16-41, 16-42, 16-43; 16'-41, 16'-42, 16'-42 to the test pattern 17, as indicated in step 620.

Next, the actuator 51 identifies a sensor whose response best satisfies a predefined quality criterion in terms of response quality and response time as the sensor with a greatest operative proximity to the actuator 51, as indicated in step 630. In accordance with the invention, the response quality contains a degree of a correlation between the test pattern and the response.

The main advantage of the invention lies in the automated detection of the proximity detection of actuator and sensor, which can be carried out without engineering outlay. On the basis of this information, the functionality of the actuator, for instance in the form of KPI values, can be determined.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining proximity relationships between an actuator and sensors which interact with the actuator in an installation for controlling a technical process and which communicate with the actuator, the actuator influencing the process and the sensors capturing measured values of process variables, the method comprising:
   influencing, by the actuator, the technical process in accordance with a predefined test pattern;
   searching, by the actuator, for the predefined test pattern in sequences of measured values received from the sensors as responses to the test pattern; and
   identifying, by the actuator, a sensor whose response best satisfies a predefined quality criterion in terms of response quality and response time as the sensor with a greatest operative proximity to the actuator;
   wherein the response quality contains a degree of a correlation between the test pattern and the response.

2. The method as claimed in claim 1, wherein the actuator utilizes measured values of the identified sensor to check functionality of the identified sensor in the installation.

3. The method as claimed in claim 2, wherein the actuator activates the sensors to transmit the measured values captured during the influence of the process in accordance with the predefined test pattern to the actuator.

4. The method as claimed in claim 2, wherein the actuator activates the sensors to store the measured values captured during the influence of the process in accordance with the predefined test pattern and then transmits the stored sequences of measured values to the actuator.

5. The method as claimed in claim 1, wherein the actuator activates the sensors to transmit the measured values captured during the influence of the process in accordance with the predefined test pattern to the actuator.

6. The method as claimed in claim 1, wherein the actuator activates the sensors to store the measured values captured during the influence of the process in accordance with the predefined test pattern and then transmits the stored sequences of measured values to the actuator.

7. The method as claimed in claim 1, wherein with different sensor types the actuator selects the sensors from a group of the same sensor type in each case.

8. An arrangement for determining proximity relationships between an actuator and sensors which interact with the actuator in an installation for controlling a technical process and which communicate with the actuator, the actuator influencing the technical process and the sensors capturing measured values of process variables;
   wherein the actuator is configured to:
      influence the process according to a predefined test pattern;
      search for the predefined test pattern in sequences of measured values received from the sensors as responses to the test pattern; and
      identify a sensor whose response best satisfies a predefined quality criterion in terms of response quality and response times as the sensor with a greatest operative proximity to the actuator; and
   wherein the response quality contains a degree of a correlation between the test pattern and the response.

9. The arrangement as claimed in claim 8, wherein the actuator is configured to utilize measured values of the identified sensor to check functionality of the identified sensor in the installation.

10. The arrangement as claimed in claim 9, wherein the actuator is configured to activate the sensors to transmit the measured values captured during the influence of the process in accordance with the predefined test pattern to the actuator.

11. The arrangement as claimed in claim 9, wherein the actuator is configured to activate the sensors to store the measured values captured during the influence of the process in accordance with the predetermined test pattern and then to transmit the stored sequences of measured values to the actuator.

12. The arrangement as claimed in claim 7, wherein the actuator is configured to activate the sensors to transmit the measured values captured during the influence of the process in accordance with the predefined test pattern to the actuator.

13. The arrangement as claimed in claim 8, wherein the actuator is configured to activate the sensors to store the measured values captured during the influence of the process in accordance with the predetermined test pattern and then to transmit the stored sequences of measured values to the actuator.

14. The arrangement as claimed in claim 8, wherein with different sensor types the actuator is configured to select the sensors from a group of in each case the same sensor type.

15. The arrangement as claimed in claim 8, wherein the actuator is a position regulator with a control valve and the sensors are flow rate meters.

\* \* \* \* \*